J. BOHAN.
Wheel Cultivator.
No. 95,762.  Patented Oct. 12, 1869.
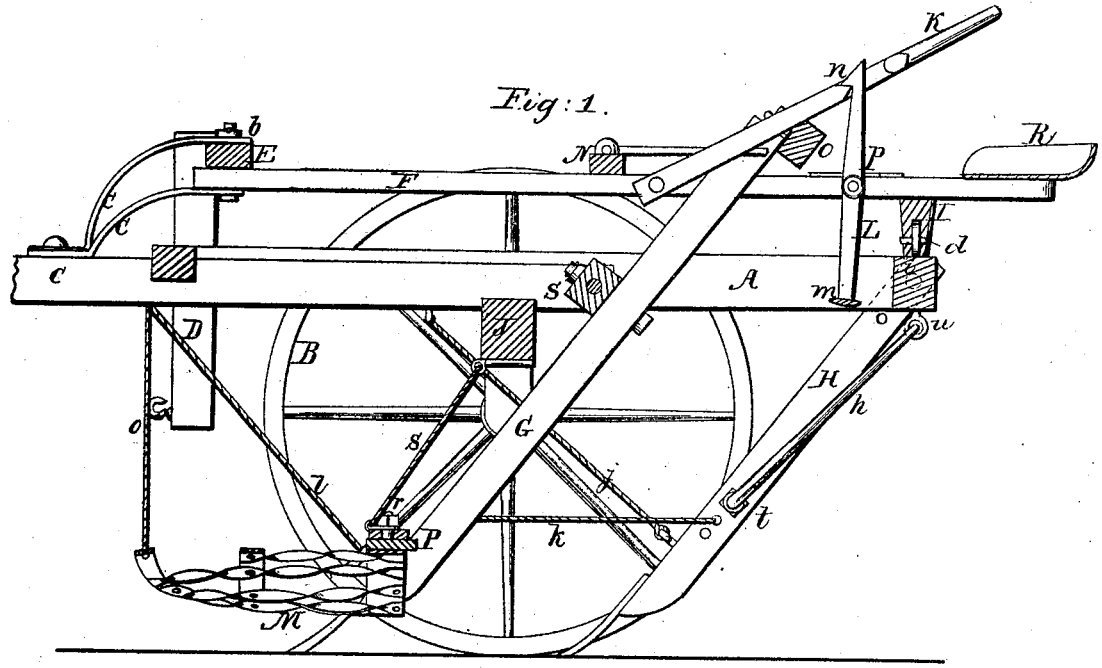
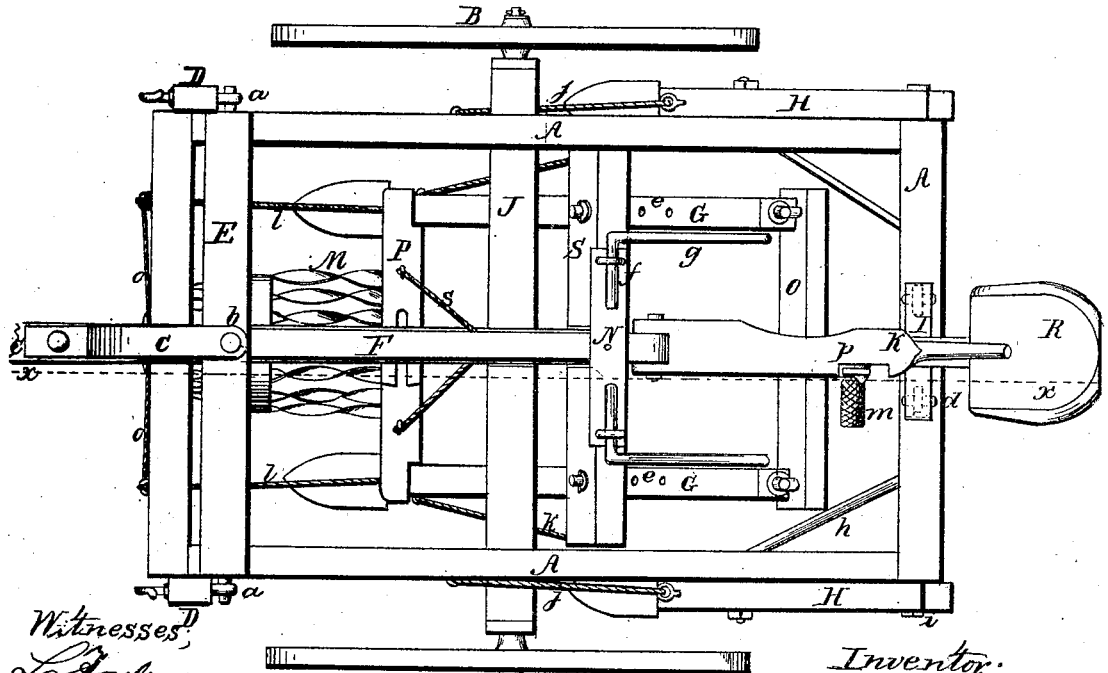

UNITED STATES PATENT OFFICE.

JEREMIAH BOHAN, OF NEW HARTFORD, IOWA.

IMPROVEMENT IN CULTIVATORS.

Specification forming part of Letters Patent No. 95,762, dated October 12, 1869.

*To all whom it may concern:*

Be it known that I, JEREMIAH BOHAN, of New Hartford, in the county of Butler and State of Iowa, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cultivators; and it consists in the novel construction and arrangement of a series of devices for adjusting the shovels, and allowing them to be moved laterally, as desired, by the operator; also, in the construction and arrangement of a shield, to protect and straighten up the plants that are being cultivated.

In the drawings, Figure is a longitudinal vertical section on the line $x\ x$ of Fig. 2, and Fig. 2 is a top plan view.

In constructing my cultivator, I make a rectangular frame, A, and mount it on wheels B, as shown in both figures, and to this frame attach rigidly a tongue, C, extending it back so as to reach a little back of the axle J, as shown in Fig. 2.

On each side of the front end of the frame A, I attach an upright, D, so as to extend about equal distances above and below the frame, as shown in Fig. 1, and to turn loosely on their points of attachment; and in the rear sides of the uprights D, and near their upper ends, I insert eyebolts $a$, and in these eyebolts mount an evener, E, having pins in its ends for that purpose, as shown in Fig. 2, and to the under side of the evener E connect, by a bolt, $b$, a sweep, F, at the same time connecting by the same bolt two metallic straps, $c$, the end of one of them being above the evener E and the end of the other below the sweep F, and having their opposite ends connected to the tongue C, all as clearly shown in Fig. 1. These metallic straps $c$ aid in supporting and strengthening the evener E, and the connection is such as to allow all the parts to turn on the bolt $b$.

On the rear end of the sweep F, which is made of sufficient length to extend beyond the rear end of the frame A, I mount the driver's seat R, and to the under side of the sweep, in front of the driver's seat, and so as to be immediately over the rear cross-piece of the frame A, I attach rigidly a block, I, having inserted in its under side two small friction-wheels, $d$, as shown in dotted lines in both figures. These wheels roll on the frame when the end of the sweep is moved laterally, as hereinafter explained.

Between the sides of the frame A and the opposite sides of the rear end of the tongue, and behind the axle J, I mount two blocks, with their bearings in the frame and the tongue, and so as to turn easily in their bearings, and to these blocks S pivot the shovel-beams G, which I provide with holes $e$ for vertical adjustment, as shown in Fig. 2. The upper ends of these shovel-beams I connect with a cross-piece, O, by means of pins and eyebolts, as shown in the same figure, or by any other suitable devices. This cross-piece O is on the upper side of the sweep F, as shown in Fig. 1.

In front of the cross-piece O, and to the sweep F, I attach rigidly a block, N, and insert in its upper side, and near its ends, staples $f$, in which I place arms $g$, bent at right angles, and so that their free ends may be brought to bear against the inner sides of the shovel-beams G, as shown in Fig. 2; and just in the rear of this block N, and to the sweep F, I attach, loosely, a lever, K, having its end forked so as to straddle the sweep at its point of connection, as shown in the same figure.

To the outside of the sides of the frame A, and near its rear end, I connect two other shovel-beams, H, by means of bolts $i$ and braces $h$. The braces $h$ are so connected to the frame A and to the several beams as to allow the latter to turn on the bolts $i$. The lower ends of these braces are connected to the shovel-beams by gage-nuts $t$, so that the shovels may be adjusted laterally, and the upper ends of the braces are connected to the frame by a journal passing into an eyebolt, $a$, as shown in Fig. 1. The shovel-beams H are also provided with holes to allow of their vertical adjustment, and are connected by a cord, $j$, from a point near their lower ends, to the under side of the frame A, and by another cord, $k$, to the inner shovel-beams, G, as shown in both figures, and the shovel-beams G are also connected by a cord, $l$, from a point near their lower ends, to the front of the frame, as shown in both figures.

To the sweep F, between the driver's seat R and the cross-piece O, I pivot a treadle-hook, L, having its treadle $m$ at its lower end, and so as to be in convenient reach of the foot of the driver, and its hook $n$ at its upper end, so as to catch upon the lever K, as shown in Fig. 1. The upper end of this treadle-hook is held forward by means of a spiral or other suitable spring, $p$, attached to the sweep for that purpose, as shown in both figures, and is released by pressing upon the treadle.

Under the front end of the frame, and so as to have its rear end between the front ends of the shovel G, I suspend a shield, M. This shield I make of twisted band or hoop iron, and shaped so as to tend to raise up the plants. It is constructed so as to be largest near its front end, and to be semi-cylindrical, and to have its front end curved upward, as shown in Fig. 1. It is suspended with its convex side up, its front end being held up by cords $o$, one of which runs directly up and is connected to the under side of the frame A., while two others—one on each side of the center one—extend out toward the sides of the frame and are connected to it, as shown in Fig. 2. Its rear end is connected to two braces, P, whose outer ends are notched so as to form shoulders, which bear against the shovel-beams G, and whose inner ends are slotted and lap over each other, as shown in Fig. 2, the connection being made loosely by a bolt, $r$, passing through the shield and these slotted ends, as shown in Fig. 1. From these braces P extend cords $s$ to the center of the axle J, which supports the rear end of the shield. The ends of the braces P are slotted so as to admit of lateral adjustment to suit the adjustment of the shovel-beams, as may be desired.

All of the cords used in this cultivator I connect at one end by means of a wooden pin passing through a loop of the cord, so that in the event of any great strain the pin may break, and thus save the machine from injury.

It is obvious that instead of a cord any other suitable article may be used, and be connected by a wooden pin, so as to protect the machine from injury in case of any sudden strain.

In operating my cultivator, I first adjust the shield M and the shovel-beams G and H to suit the work required to be done. Then, as the machine is driven through the field, the driver, from his seat R, can move the shovels as he may desire, by means of the lever K, since he can seize this lever by the handle and move the sweep F laterally, and without difficulty, as the friction-rollers under the block I allow it to swing easily on its front pivoted end. As this lever is moved in either direction, it will be seen that one of the arms, $g$, is brought to bear against one of the shovel-beams G, and that in this way the shovels are moved laterally.

When it is desired to raise the shovels from the ground, it is only necessary to pull down the lever K, which, as it bears on the cross-piece O, elevates the shovels on both the beams G and H, as they are connected by the cords $k$.

When the cords or any other devices connecting the lower ends of the shovel-beams to one another and to the frame are broken for any cause, the outside beams, H, it will be seen, are so connected that their lower ends can be carried back without injury to the machine, and in like manner the inside shovel-beams, G, can also be carried back, and that in this way the machine will escape being injured.

As the machine moves forward, with its shovels cultivating the ground, as described, the shield M passes over the row of plants, and by its peculiar construction and form serves not only to protect them, but also tends to raise them up if knocked down from any cause.

Having thus described my invention, what I claim is—

1. The evener E, pivoted upright B, metallic straps $c$, and sweep F, when constructed and arranged substantially as herein described, and for the purpose set forth.

2. The braces $h$, having their lower ends connected to the shovel-beams H, by means of gage-nuts $t$, for adjusting the beams laterally, and their upper ends hooked or journaled to the frame to allow them to swing, substantially as and for the purpose set forth.

3. The bent arms $g$, in combination with the block N, lever K, and sweep F, when constructed and arranged substantially as herein described, for the purpose of spreading the shovels, as set forth.

4. The lever K, in combination with the sweep F, cross-piece O, shovel-beams G and H, and cord $k$, when constructed and arranged to operate substantially as and for the purposes set forth.

5. The treadle-hook L and spring $p$, in combination with the lever K, cross-piece O, and sweep F, when constructed and arranged substantially as herein described, and for the purpose set forth.

6. In combination with the sweep F, and the devices for operating the shovels, the block I, having friction-rollers therein, when constructed and arranged substantially as and for the purpose set forth.

7. The shield M and slotted braces P, when constructed and arranged substantially as and for the purpose set forth.

JEREMIAH BOHAN.

Witnesses:
ALONZO CONVERSE,
P. N. CONVERSE.